(12) United States Patent
Monti et al.

(10) Patent No.: US 9,038,807 B2
(45) Date of Patent: May 26, 2015

(54) MOTOR VEHICLE ASSEMBLY LINE

(71) Applicant: Fiat Group Automobiles S.p.A., Turin (IT)

(72) Inventors: Denny Monti, Turin (IT); Giulio Talarico, Turin (IT); Marco Cavaglia', Turin (IT); Elio Tordella, Turin (IT); Salvatore Fazio, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 13/667,240

(22) Filed: Nov. 2, 2012

(65) Prior Publication Data
US 2013/0112527 A1 May 9, 2013

(30) Foreign Application Priority Data

Nov. 3, 2011 (IT) .............................. TO2011A1011

(51) Int. Cl.
*B62D 65/18* (2006.01)
(52) U.S. Cl.
CPC ...................................... *B62D 65/18* (2013.01)
(58) Field of Classification Search
CPC ..................................................... B62D 65/18
USPC .................................. 198/339.1, 463.1, 465.2
See application file for complete search history.

(56) References Cited

U.S. PATENT DOCUMENTS

| | | | | |
|---|---|---|---|---|
| 4,770,122 A * | 9/1988 | Ichihashi et al. | ............... | 118/697 |
| 5,012,917 A * | 5/1991 | Gilbert et al. | ............... | 198/465.2 |
| 5,319,840 A * | 6/1994 | Yamamoto et al. | ............ | 29/430 |
| 5,320,210 A * | 6/1994 | Van Den Bergh et al. | . . | 198/465.1 |
| 5,819,904 A * | 10/1998 | Tominaga et al. | ............ | 198/346 |
| 5,839,567 A * | 11/1998 | Kyotani et al. | ............... | 198/683 |
| 6,324,749 B1 * | 12/2001 | Katsuura et al. | ................ | 29/703 |
| 6,966,426 B1 * | 11/2005 | Sobczak et al. | ............ | 198/465.3 |
| 7,178,660 B2 * | 2/2007 | Dehne et al. | ............... | 198/463.1 |
| 7,658,275 B2 * | 2/2010 | Hayashi | ..................... | 198/459.8 |
| 7,861,392 B2 * | 1/2011 | Hibbler et al. | .................. | 29/429 |
| 8,459,438 B2 * | 6/2013 | Ooe | ........................... | 198/345.1 |

FOREIGN PATENT DOCUMENTS

| | | |
|---|---|---|
| JP | 4 362459 A | 12/1992 |
| WO | WO 2010/012385 A1 | 2/2010 |
| WO | WO 2011/118246 A1 | 9/2011 |

* cited by examiner

*Primary Examiner* — Gene Crawford
*Assistant Examiner* — Thomas Randazzo
(74) *Attorney, Agent, or Firm* — Dickstein Shapiro LLP

(57) ABSTRACT

An assembly line, wherein at least one operating branch of fixed length accommodates a number of platforms aligned with one another and with a given travelling direction; each platform being designed to receive a respective vehicle body, feed it in the travelling direction, and subject it to a succession of $\underline{n}$ assembly operations along the operating branch; each platform being designed for connection to at least one longitudinal extension to assume a total length, which depends on the length of the body carried, and ranges between a minimum length equal to the length of the platform with no extension, and a maximum length; and the length of the operating branch being equal to $\underline{n}$ times the maximum length.

5 Claims, 5 Drawing Sheets

MOTOR VEHICLE ASSEMBLY LINE

The present invention relates to a motor vehicle assembly line.

BACKGROUND OF THE INVENTION

Currently used motor vehicle assembly lines comprise a succession of moving platforms, each for transporting a vehicle body along an assembly path, and of a length depending on the length of the body.

Assembly lines of this sort are designed to transport a specific type of body, and have to be completely restructured to switch from one body type to another.

SUMMARY OF THE INVENTION

It is an object of the present invention to provide a versatile assembly line, i.e. adaptable cheaply and easily to different types of vehicle bodies.

According to the present invention, there is provided a motor vehicle assembly line as claimed in the accompanying Claims.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
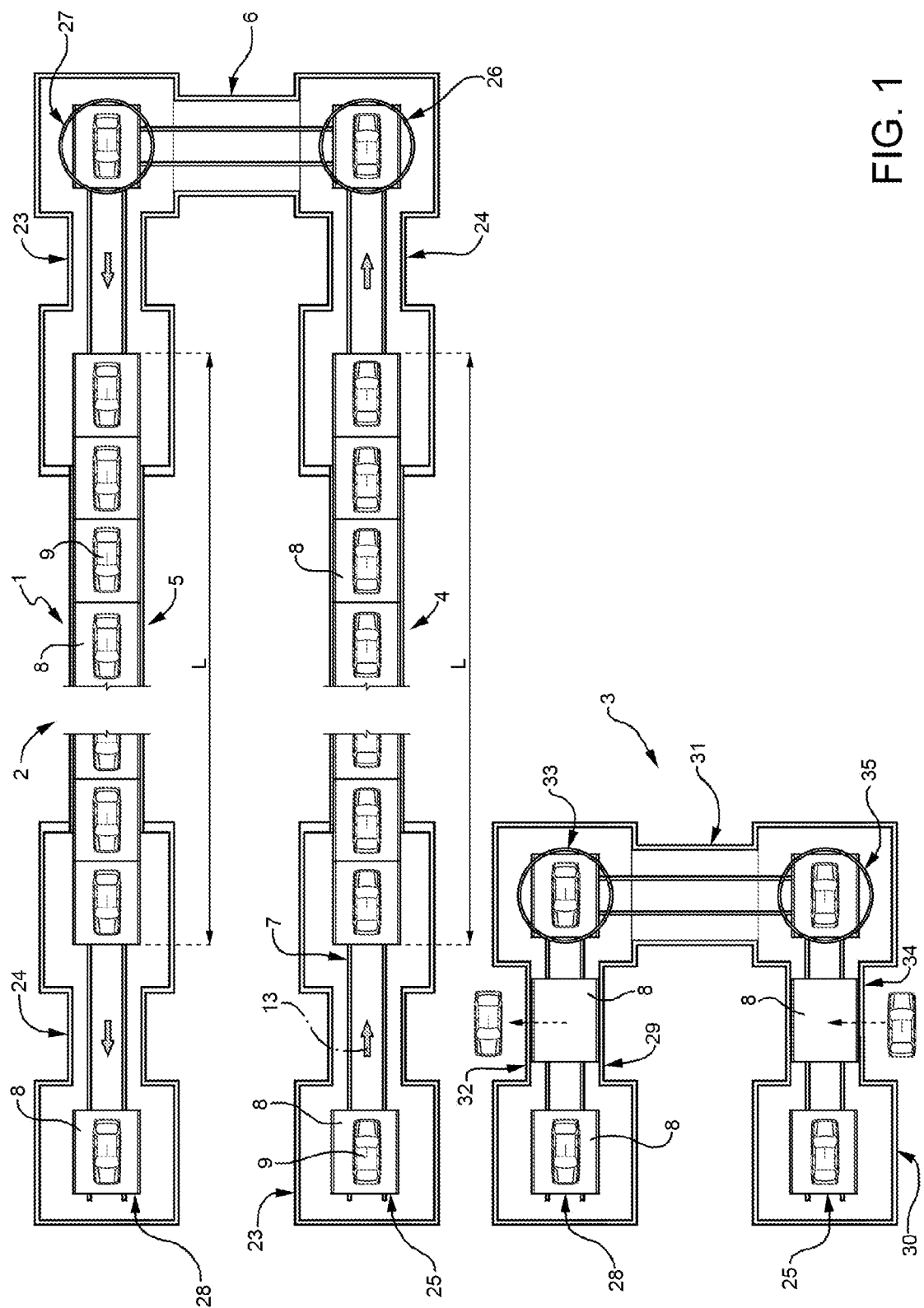
FIG. 1 shows a schematic layout of a preferred embodiment of the assembly line according to the present invention.

Number 1 in FIG. 1 indicates as a whole a motor vehicle assembly line.

Line 1 is an endless line comprising two U-shaped portions 2 and 3, which are located at different levels, portion 2 lower than portion 3, and overlap as described below (for the sake of clarity, portion 3 is shown coplanar with and alongside portion 2 in FIG. 1).

Portion 2 comprises an input branch 4, an output branch 5, and a transfer branch 6 connecting the output of input branch 4 to the input of output branch 5. Input branch 4 and output branch 5 are the same length L, and each comprise a conveyor 7 for a number of platforms 8 contacting end to end and each of which supports a motor vehicle body 9 and is of a length S depending on the length of relative body 9.

Figure 2:
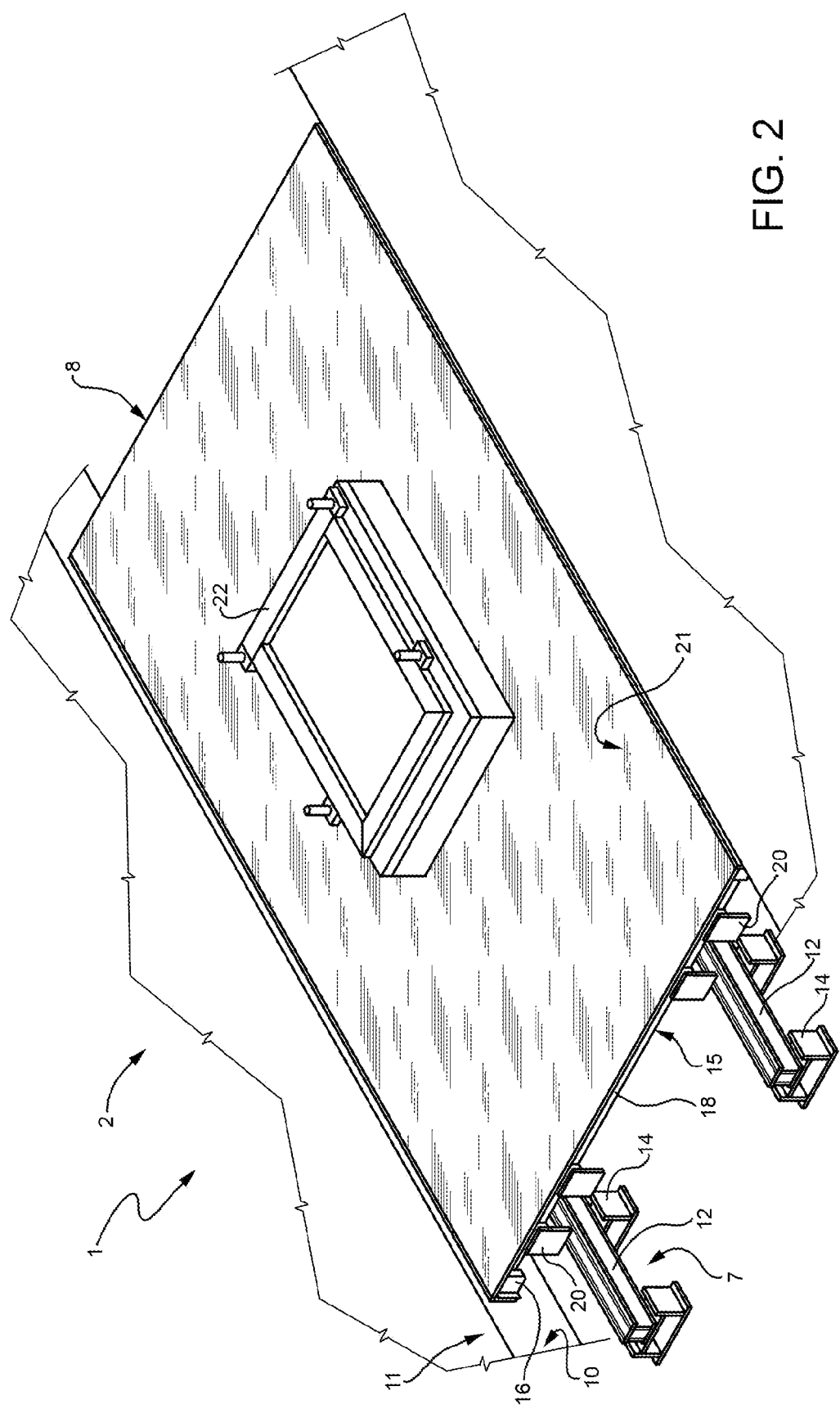
FIG. 2 shows a larger-scale view in perspective of a detail in FIG. 1.

As shown in FIG. 2, each conveyor 7 is housed inside a pit 10 formed in a floor 11, and comprises two rails 12 parallel to a travelling direction 13 and supported in a fixed position on supporting blocks 14.

Figure 3:
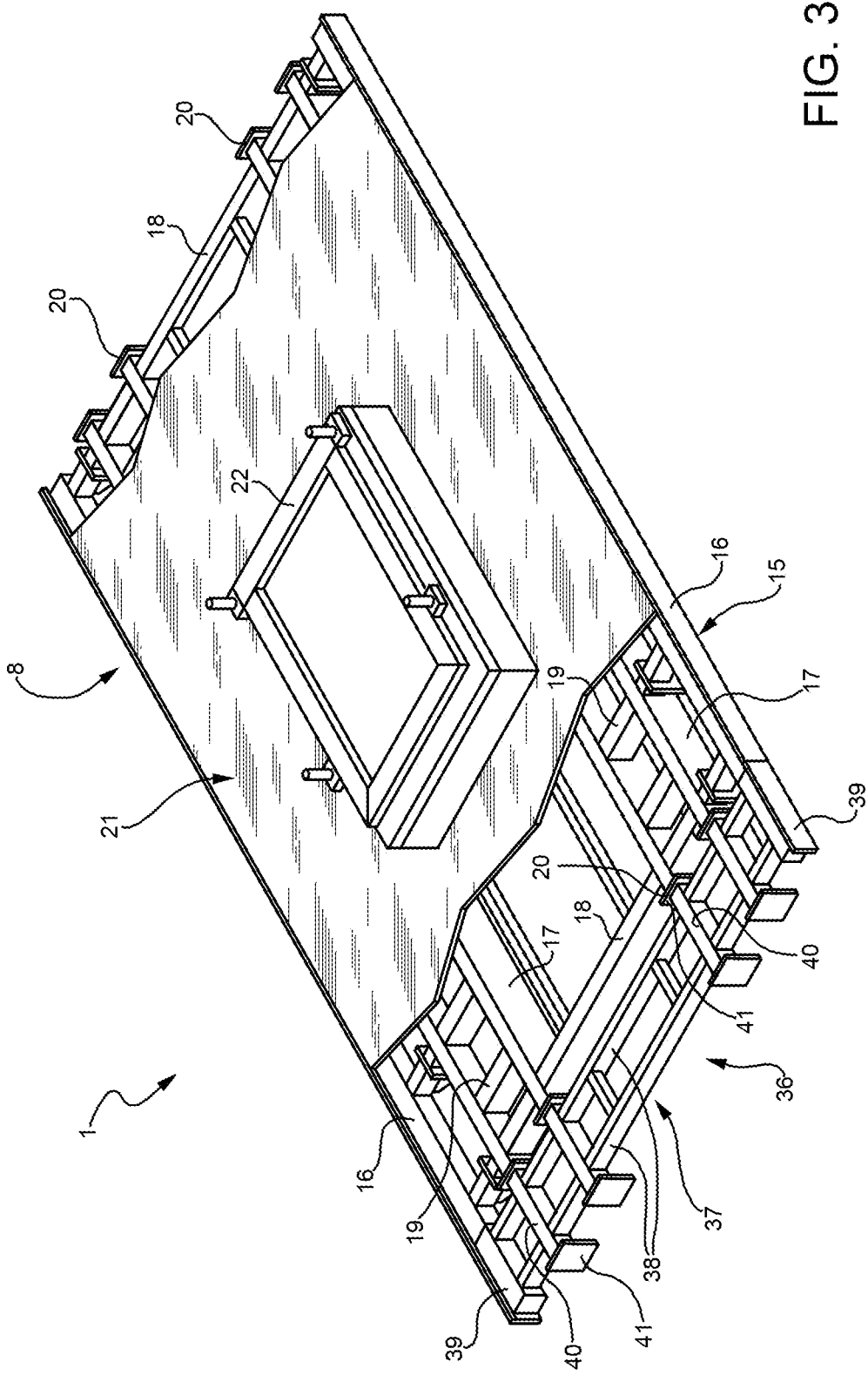
FIG. 3 shows the same view as in FIG. 2, of a variation of the FIG. 2 detail.

As shown in FIG. 3, each platform 8 comprises a frame 15 supported on rails 12 with the interposition of a number of trolleys, and in turn comprising two outer longitudinal members 16 and a number of intermediate longitudinal members 17 connected by two end cross members 18 and a number of intermediate cross members 19. Each end of each longitudinal member 17 projects from the relative end cross member 18, and is fitted with a plate 20 for the purpose described below.

Each platform 8 also comprises a normally wooden floor 21, which covers the rectangular grid defined by frame 15, and defines a walk-on surface coplanar with floor 11 (FIG. 2). Finally, each platform 8 also comprises a known electromechanical lift table 22, which is fitted to the centre of frame 15, through an opening in floor 21, supports a respective body 9, and is connected in known manner to an electric power supply mains (not shown) by sliding contacts or induction (not shown) on frame 15.

Input branch 4 and output branch 5 are each equipped in known manner (not shown) with a device for moving platforms 8, contacting end to end, forward, and which comprises, in known manner not shown, a friction push device located at the input of relative input branch 4, output branch 5, and cooperating frictionally with the outer lateral surfaces of longitudinal members 16; and a friction brake device located at the output of relative input branch 4, output branch 5, and which frictionally engages the outer lateral surfaces of longitudinal members 16, and cooperates in known manner with the friction push device to move platforms 8, contacting end to end, in travelling direction 13 at a given constant speed V.

As shown in FIG. 1, a receiving branch 23 and a pickup branch 24 are connected in-line to the input and output respectively of each of input and output branches 4 and 5.

More specifically, receiving branch 23 of input branch 4 receives platforms 8 at zero linear speed from an elevator 25, accelerates them to a speed V1, and then decelerates them to a speed V2 (V1>V2) approximating but no less than the travelling speed V of platforms 8 along input branch 4. And pickup branch 24 of input branch 4 receives platforms 8 at the travelling speed V of platforms 8 along input branch 4, accelerates them to speed V1, and then decelerates them to zero linear speed for loading onto an input turntable 26 of transfer branch 6.

Receiving branch 23 of output branch 5 receives platforms 8 at zero linear speed from an output turntable 27 of transfer branch 6, accelerates them to speed V1, and then decelerates them to a speed V2 (V1>V2) approximating but no less than the travelling speed V of platforms 8 along output branch. 5. And pickup branch 24 of output branch 5 receives platforms 8 at speed V, accelerates them to speed V1, and then decelerates then to zero linear speed at an elevator 28.

Elevator 28 connects the output of portion 2 to the input of portion 3, and elevator 25 connects the output of portion 3 to the input of portion 2.

From elevator 28, portion 3 comprises an input branch 29 and an output branch 30 connected by a transfer branch 31. Input branch 29 extends through an unloading station for unloading the assembled bodies 9 off respective platforms 8, and between elevator 28 and an input turntable 33 of transfer branch 31; and output branch 30 extends through a loading station 34 for loading the unassembled bodies 9 onto respective platforms 8, and between an output turntable 35 of transfer branch 31 and elevator 25.

Figure 4:
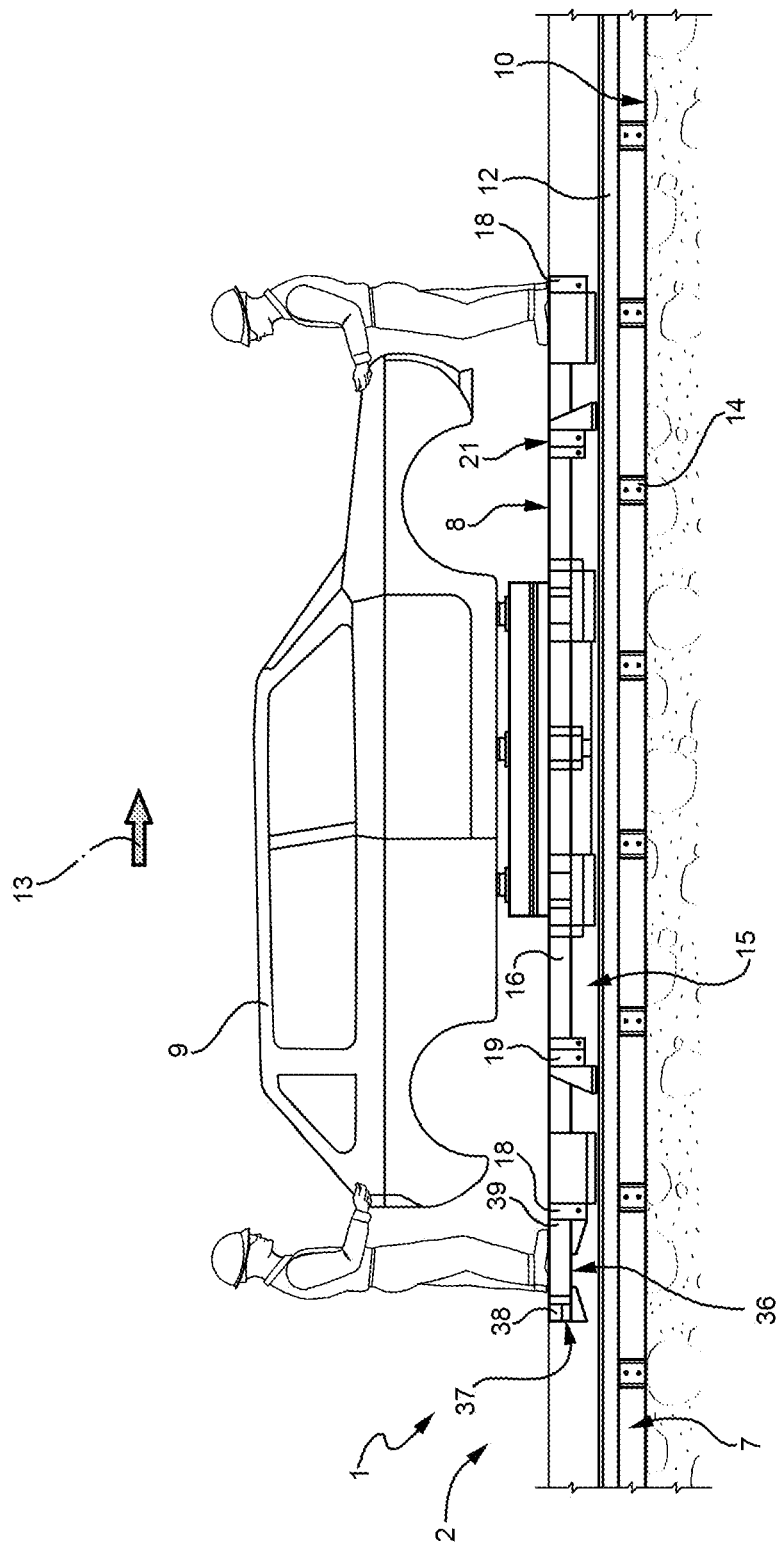
FIG. 4 shows a side view of the FIG. 3 detail.
Figure 5:
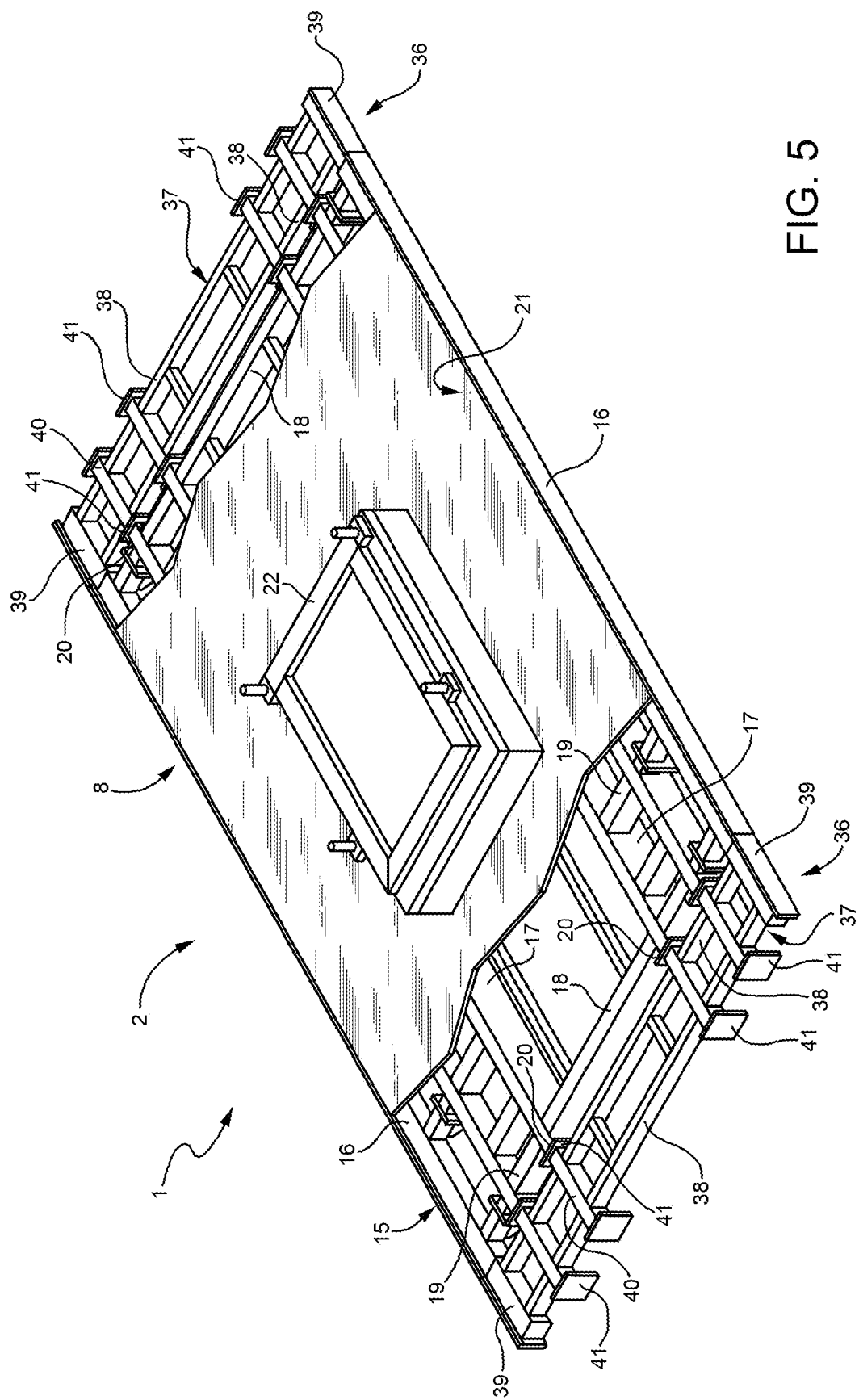
FIG. 5 shows the same view as in FIG. 2, of a further variation of the FIG. 2 detail.

With reference to FIGS. 3 and 4, the length P of each platform 8 is adjustable to the length of body 9 by fitting platform 8 with one or two end extensions 36, each comprising a frame 37 covered with a floor (not shown) similar to and coplanar with floor 21. Frame 37 is the same width as frame 15, and comprises two cross members 38, the corresponding ends of which are connected by two outer longitudinal members 39 spaced the same distance apart as longitudinal members 16; and the intermediate portions of cross members 38 are connected by a number of intermediate longitudinal members 40, of length E, which are fitted on each end with a plate 41 similar to plates 20, and are spaced the same distance apart between longitudinal members 39 as longitudinal members 17 between longitudinal members 16.

Each platform 8 of length:

$$S=Smin=P$$

is extended to form a composite platform 8 of a total length S:

$$S=Sint=P+E \text{ or } S=Smax=P+2E$$

by positioning frame 37 of (or of each) extension 36 coplanar with frame 15, with longitudinal members 39 aligned with respective longitudinal members 16, with longitudinal members 40 aligned with respective longitudinal members 17, and with plates 41 (the ones facing frame 15) positioned contacting respective plates 20; and by connecting each two contacting plates 41 and 20, using screws and/or through bolts and/or any other removable fast-fit connecting devices, to fit extension 36, or each extension 36, to and projecting from frame 15 of platform 8 to form a respective composite platform 8.

In the example shown, platforms 8 along both input and output branches 4 and 5 are arranged contacting end to end and have all the same length S, and the length L of each of input and output branches 4 and 5 is calculated as follows:

$$L=\underline{n} \cdot Smax; L \approx \underline{m} \cdot Smin; L \approx \underline{r} \cdot Sint$$

where:

$$\underline{m}=L/Smin > n \; \underline{r}=L/Sint > \underline{n} < \underline{m}$$

and where, hereinafter and in the Claims:
  $\underline{n}$ is intended to represent the number of assembly operations to be performed along each of input and output branches 4 and 5, and
  the term 'assembly operation' is intended to mean all the operations performed on the body as respective platform 8 moves forward by a distance equal to the length of platform 8.

When using platforms 8 of length Smin or Sint, there will therefore be, at the end of each of input and output branches 4 and 5, a certain number of platforms 8 ($\underline{m}$-$\underline{n}$ or $\underline{r}$-$\underline{n}$) not used to perform any assembly operations on respective bodies 9.

In actual use, after fitting line 1 with platforms 8 of the right length to support bodies 9 for assembly, all the branches of line 1 are set in motion. In particular, input and output branches 4 and 5 are set in motion at a given constant speed compatible with the work to be carried out.

Platforms 8 are loaded with respective bodies 9 at loading station 34; after which, each platform 8 loaded with respective body 9 is fed to elevator 25, which lowers it to the level of the input of receiving branch 23, which feeds it onto input branch 4.

Platforms 8, contacting end to end, travel along input branch 4, are transferred by transfer branch 6 to the input of output branch 5, and, contacting end to end, travel up to pickup branch 24 and elevator 28, which raises them successively to the level of input branch 29.

At this point, platforms 8 are fed to unloading station 32, where the finished bodies 9 are unloaded off respective platforms 8; and platforms 8 are fed back along transfer branch 31 to loading station 34 to receive further bodies 9 for assembly.

As will be clear from the above description:
  line 1 provides for assembling bodies 9 of different lengths; and
  the working space occupied along each of input and output branches 4 and 5 varies in proportion to the length of bodies 9 being assembled, thus minimizing operator movement.

Obviously, in a variation not shown, input and output branches 4 and 5 may be arranged in-line by eliminating transfer branch 6, pickup branch 24 of input branch 4 and receiving branch 23 of output branch 5, and by modifying portion 3 of line 1 accordingly. In which case, a return line must obviously be provided to return the empty platforms 8 from unloading station 32 to loading station 34.

In a variation not shown, extensions 36 are mounted on platforms 8, and are connected to and extractable from frames 15 telescopically.

The invention claimed is:

1. A motor vehicle assembly line designed to assume different configurations to assemble different motor vehicle bodies;
  the assembly line comprising at least one operating branch of a fixed length, regardless of the chosen configuration; the operating branch comprising a number of platforms aligned with one another along a given travelling direction; and each platform being designed to receive a respective body, feed it in said travelling direction, and subject it to a succession of n assembly operations along said operating branch;
  each platform being designed to be coupled to at least one longitudinal extension to assume a total length of a platform, which depends on the length of the body to be carried, wherein the total length of the platform is configurable to be a minimum length equal to the length of the platform without said extension coupled to the platform, and a maximum length of the platform equal to the length of the platform with said extension coupled to the platform;
  the fixed length of the operating branch being equal to n times said maximum length of the platform;
  wherein the at least one longitudinal extension is designed to be removably mounted to the respective platform; and
  wherein each platform comprises a substantially rectangular first frame defined on top by a walk-on surface and fitted at its longitudinal ends with first connecting means; and each extension comprises a second frame of the same width as the first frame and fitted at one longitudinal end with second connecting means, the second connecting means cooperating with the first connecting means to connect the extension rigidly to the first frame.

2. An assembly line as claimed in claim 1, wherein the platforms have all the same total length.

3. An assembly line as claimed in claim 1, wherein the platforms are arranged to contact end to end along the operating branch, so as to form a continuous conveying surface.

4. An assembly line as claimed in claim 1, wherein the operating branch comprises a friction push device for moving the platforms along the operating branch and in the travelling direction at a given constant speed.

5. An assembly line as claimed in claim 1, wherein the operating branch comprises a conveyor comprising rail means arranged to extend in the travelling direction and slidably coupled to the platforms to guide the platforms along the operating branch.

* * * * *